United States Patent
Okamoto

(10) Patent No.: US 6,329,087 B1
(45) Date of Patent: Dec. 11, 2001

(54) WAFER FOR MAGNETIC HEAD AND MAGNETIC HEAD

(75) Inventor: Naoyuki Okamoto, Ibaraki (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/352,344

(22) Filed: Jul. 13, 1999

(30) Foreign Application Priority Data

Jul. 13, 1998 (JP) .................................... 10-213478
Oct. 2, 1998 (JP) .................................... 10-294684
Jul. 7, 1999 (JP) .................................... 11-192431

(51) Int. Cl.$^7$ .................................................. G11B 5/127
(52) U.S. Cl. ......................... 428/692; 360/120; 360/126; 360/313
(58) Field of Search ........................... 428/692; 360/120, 360/126, 313

(56) References Cited

U.S. PATENT DOCUMENTS 4,861,671 * 8/1989 Muchnik et al. .................... 428/457
4,901,179 * 2/1990 Satomi et al. ....................... 360/126

FOREIGN PATENT DOCUMENTS 1-150215 * 6/1989 (JP) .

* cited by examiner

Primary Examiner—Stevan A. Resan
(74) Attorney, Agent, or Firm—Armstrong, Westerman, Hattori, McLeland & Naughton

(57) ABSTRACT

A wafer includes an insulating layer provided on a wafer substrate and formed of a film composition represented by a formula, $Al-N_{(1-x)}-O_x$ (wherein $0.05 \leq x \leq 0.8$).

There is provided a wafer for a magnetic head as well as a magnetic head which is excellent in heat transferring property; in which the instability of a magnetic head characteristic due to a temperature rise is produced, and a reduction in output due to the polishing at a finishing step cannot be produced; and which is excellent in water resistance.

8 Claims, 1 Drawing Sheet

WAFER FOR MAGNETIC HEAD AND MAGNETIC HEAD

BACKGROUND OF THE INVENTION AND DESCRIPTION OF THE PRIOR ART

The present invention relates to a wafer for use in a magnetic head capable of reading and writing on a magnetic medium, and to a magnetic head produced from such a wafer. More particularly, the present invention relates a wafer for a magnetic head, which is excellent in heat transferring property, so that the temperature is less risen during reading or writing, and to a magnetic head produced from such a wafer.

In such a conventional type of a magnetic head, thin magnetic films such as an insulating layer, a magnetic shield film, a bottom pole and a top pole; an MR element; a gap layer; a coil layer and an overcoat are formed on a surface of a substrate formed of, for example, an alumina-titanium carbide and the like.

The insulating films such as the insulating layer, the gap layer and the overcoat are usually formed of alumina.

With the above conventional magnetic head, the insulating films such as the insulating layer, the gap layer and the overcoat are formed of alumina, as described above. Therefore, the conventional magnetic head suffers from problems of a lower heat conductivity, a poor heat transferring property and an instability of the characteristic of the magnetic head due to a temperature rise. Particularly, when the magnetic head includes an MR element, there is a disadvantage that the temperature rise is significant, whereby the motion of the MR element is unstable, because the MR element is a reading element. Another problem is that because the insulating layer is formed of alumina, when the surface of the magnetic head is polished at a finishing step, only the alumina material is polished in a larger amount to produce a difference in level, for a reason that the alumina material is softer than another material. As a result, the gap between a medium and a recording/regenerating element is widened, thereby causing a reduction in output. Further, the conventional magnetic head has a disadvantage that it is poor in water resistance.

OBJECT AND SUMMARY OF THE INVENTION

Accordingly, it is an object of the present invention to provide a wafer for a magnetic head, and to a magnetic head, which has an excellent heat-transferring property, in which the instability of the magnetic head characteristic due to a temperature rise is not caused, and a reduction in output due to the polishing at the finishing step cannot be produced, and which is excellent in water resistance.

The present inventors have made zealous studies to solve the above problems and as a result, they have found that the above problems can be solved by using a film composition represented by a formula, Al—$N_{(1-x)}$—$O_x$ (wherein, $0.3 \leq x \leq 0.6$), in place of alumina conventionally used for the insulating film such as the insulating layer, the gap layer, the overcoat and the like provided on the substrate.

To achieve the above object, according to a first aspect of the present invention, there is provided a wafer for a magnetic head, comprising a wafer substrate, and an insulating layer provided on the wafer substrate and formed of a film composition represented by a formula, Al—$N_{(1-x)}$—$O_x$, wherein $0.05 \leq x \leq 0.8$.

According to a second aspect of the present invention, in addition to the first aspect, the wafer substrate is alumina-titanium carbide.

According to a third aspect of the present invention, there is provided a wafer for a magnetic head, comprising a wafer substrate, and an insulating layer provided on the wafer substrate ad formed of a film composition represented by a formula, Al—$N_{(1-x)}$—$O_x$, wherein $0.3 \leq x \leq 0.6$.

According to a fourth aspect of the present invention, in addition to the third aspect, the wafer substrate is alumina-titanium carbide.

According to a fifth aspect of the present invention, there is provided a magnetic head, comprising a magnetic head substrate, and an insulating layer provided on said magnetic head substrate and formed of a film composition represented by a formula, Al—$N_{(1-x)}$—$O_x$, wherein $0.05 \leq x \leq 0.8$.

According to a sixth aspect of the present invention, in addition to the fifth aspect, the magnetic head further includes an MR element, and a gap film provided in the proximity to the MR element and formed of a film composition represented by a formula, Al—$N_{(1-x)}$—$O_x$, wherein $0.05 \leq x \leq 0.8$.

According to a seventh aspect of the present invention, in addition to the sixth aspect, the magnetic head further includes an overcoat formed of a film composition represented by a formula, Al—$N_{(1-x)}$—$O_x$, wherein $0.05 \leq x \leq 0.8$.

According to an eighth aspect of the present invention, in addition to the seventh aspect, the substrate is alumina-titanium carbide.

According to a ninth aspect of the present invention, there is provided a magnetic head, comprising a magnetic head substrate, and an insulating layer provided on the magnetic head substrate and formed of a film composition represented by a formula, Al—$N_{(1-x)}$—$O_x$, wherein $0.3 \leq x \leq 0.6$.

According to a tenth aspect of the present invention, in addition to the ninth aspect, the magnetic head further includes an MR element, and a gap film provided in the proximity to the MR element and comprised of a film composition represented by a formula, Al—$N_{(1-x)}$—$O_x$, wherein $0.3 \leq x \leq 0.6$.

According to an eleventh aspect of the present invention, in addition to the tenth aspect, the magnetic head further includes an overcoat formed of a film composition represented by a formula, Al—$N_{(1-x)}$—$O_x$ wherein $0.3 \leq x \leq 0.6$.

According to a twelfth aspect of the present invention, in addition to the eleventh aspect, the substrate is alumina-titanium carbide.

As described above, by using a film composition represented by a formula, Al—$N_{(1-x)}$—$O_x$, wherein $0.05 \leq x \leq 0.8$, in place of the conventionally used alumina, for an insulating film such as an insulating layer, a gap layer, an overcoat and the like provided on a substrate, a wafer for a magnetic head as well as a magnetic head excellent in heat transferring property. In this magnetic head, the instability of the magnetic head characteristic due to a temperature rise is not caused, and a reduction in output due to a larger gap between the magnetic head and a medium cannot be produced by a difference in film level due to due to the polishing at a finishing step. Further, the magnetic head is also excellent in water resistance.

Particularly, by using a film composition represented by a formula, Al—$N_{(1-x)}$—$O_x$, wherein $0.3 \leq x \leq 0.6$, a wafer for a magnetic head as well as a magnetic head can be produced which can reconcile a smaller difference in film level and a higher heat conductivity and a higher voltage resistance.

The insulating layer may be provided on the wafer substrate or on the magnetic head substrate directly or with an alumina sputtered layer interposed therebetween.

EMBODIMENTS

Figure 1:
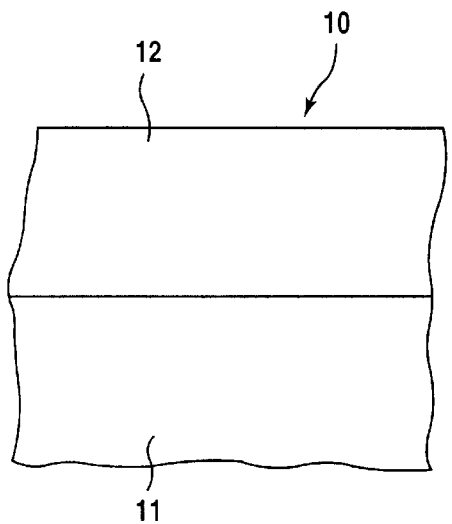
FIG. 1 is a diagram showing the sectional structure of an embodiment of a wafer for a magnetic head according to the present invention.
Figure 2:
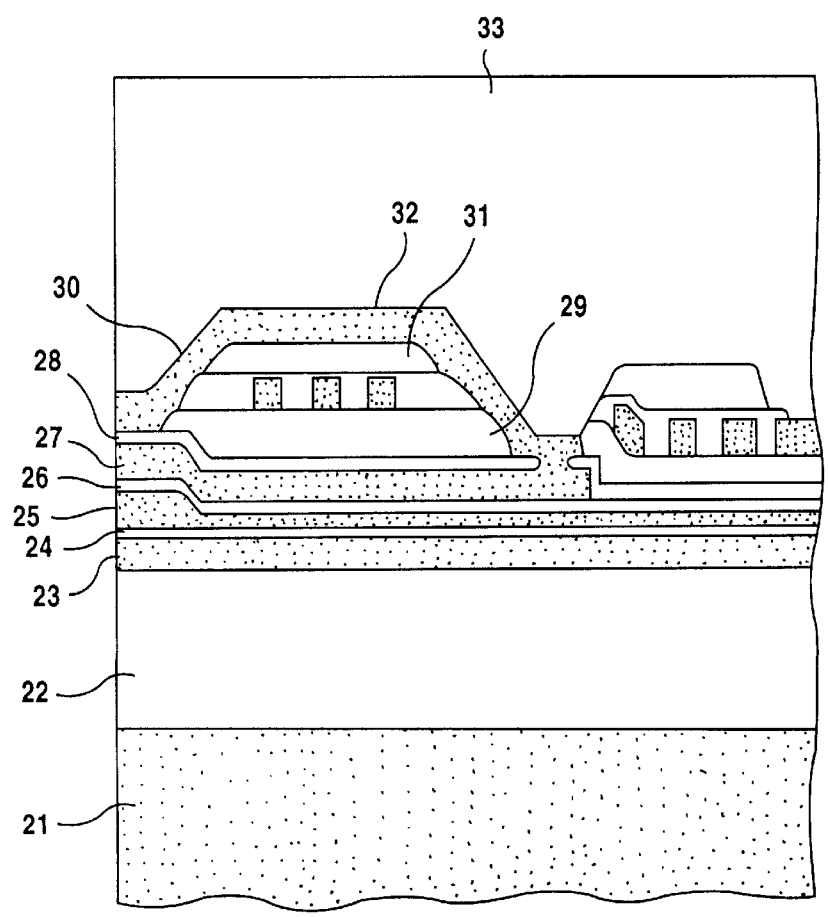
FIG. 2 is a diagram showing the sectional structure of an embodiment of a magnetic head according to the present invention.

The present invention will now be described by way of embodiments with reference to the accompanying drawings.

(Fabrication of magnetic head wafer)

First, an alumina-titanium carbide wafer substrate 11 comprising 64% by weight of alumina and the balance of titanium carbide and having a diameter of 3 inches was prepared. Then, the film-forming surface of the substrate 11 was subjected to a mirror polishing treatment using diamond abrasive grains having a grain size of 1 $\mu$m, so that the degree Ra of surface roughness is equal to 2 nm. Subsequently, an AlNO film was formed on the polished surface in an $Ar/O_2$ mixture atmosphere by an RF magnetron sputtering process using an AlN sintered compact as a target. In this case, the film was formed into a thickness of 8 to 10 $\mu$m at a forming rate of 20 nm/min under conditions of an RF thrown power of 4 $W/cm^2$, a partial pressure of oxygen equal to 5% and the total pressure of 10 m Torr and T/S equal to 70 mm.

The film forming method is not limited to the sputtering in the $Ar/O_2$ mixture atmosphere with the AlN sintered compact used as the target, and a similar film could be formed even by a sputtering using a metal aluminum target in an atmosphere of an $Ar/O_2/N_2$ mixture.

The composition of the film represented by a formula, Al—$N_{(1-x)}$—$O_x$ (wherein $0.05 \leq x \leq 0.8$) is regulated by controlling the partial pressure of oxygen in the atmosphere of the $Ar/O_2$ mixture flowing during formation of the film.

The surface of the film formed in the above manner was subjected to a so-called MCP polishing treatment using oxide fine abrasive grains such as CeO or a cloth, so that the degree Ra of roughness of the film surface is equal to 5 nm, thereby producing a magnetic head wafer 10 having an insulating layer 12 with a film composition represented by the formula, Al—$N_{(1-x)}$—$O_x$ (wherein $0.05 \leq x \leq 0.8$) on its surface.

(Fabrication of magnetic head)

An alumina-titanium carbide substrate 21 was prepared which was formed into a substrate shape from the alumina-titanium carbide wafer substrate 11 comprising 64% by weight of alumina and the balance of titanium carbide and having the diameter of 3 inches. Then, the film-forming surface of the alumina-titanium carbide substrate 21 was subjected to a mirror polishing treatment using diamond abrasive grains having a grain size of 1 $\mu$m, so that the degree Ra of surface roughness is equal to 2 nm. Subsequently, an AlNO film was formed on the polished surface in an $Ar/O_2$ mixture atmosphere by an RF magnetron sputtering process using an AlN sintered compact as a target. In this case, the film was formed into a thickness of 8 to 10 $\mu$m at a forming rate of 20 nm/min under conditions of an RF thrown power of 4 $W/cm^2$, a partial pressure of oxygen equal to 5% and the total pressure of 10 m Torr and T/S equal to 70 mm.

Subsequently, the surface of the film formed in the above manner was subjected to a so-called MCP polishing treatment using oxide fine grains such as CeO or a cloth, so that the degree Ra of roughness of the film surface is equal to 5 nm, thereby forming an insulating layer 22 having a composition represented by the formula, Al—$N_{(1-x)}$—$O_x$ (wherein $0.05 \leq x \leq 0.8$) on its surface.

In the above manner, the insulating layer 22 having the composition represented by the formula, Al—$N_{(1-x)}$—$O_x$ (wherein $0.05 \leq x \leq 0.8$) was provided on the surface of the alumina-titanium carbide substrate 21.

Then, a film having a composition comprising 80% by weight of Ni and the balance of Fe was formed on the insulating layer 22 and subjected to an MCP mirror polishing treatment similar to that described above, thereby forming a magnetic shield film Subsequently, an AlNO film having a composition similar to that described above was formed into a thickness of 100 nm as a gap film 24 on the magnetic shield film 23 by a sputtering. An MR element 25 was formed on the AlNO film by a photolithography and a sputtering. Further, an AlNO film having a composition similar to that described above was formed again into a thickness 80 nm as a gap film 26 on the MR element 25 by a sputtering.

In this manner, the gap films 24 and 26 adjacent the MR element 25 were formed of the composition represented by the formula, Al—$N_{(1-x)}$—$O_x$ (wherein $0.05 \leq x \leq 0.8$).

Then, a bottom pole 27 having a composition comprising 80% by weight of Ni and the balance of Fe was formed as a writing element on the gap film 26 by a photolithography and an electroplating. An AlNO film having a composition similar to that described above was formed into a thickness of 400 nm as a writing gap film 28 on the bottom pole 27.

An organic insulating film 29 was formed on the writing gap film 28 by a spin coating technique. A coil pattern 30 of Cu was formed on the organic insulating film 29 by an electroplating process. Further, an organic insulating film 31 was formed on the coil pattern 30 in the same manner as described above.

Then, a top pole 32 having a composition comprising 80% by weight of Ni and the balance of Fe was formed as a writing element by a photolithography and an electroplating, so that a predetermined track width was provided.

Finally, an AlNO film having a composition similar to that described above was formed into a thickness of 60 $\mu$m as an overcoat 33 by a sputtering, thus forming a magnetic head element.

Further, the substrate 21 having the elements formed thereon in the above manner was cut into a slider size by machining, so that a surface to come into contact with a medium has a predetermined floating property and shows a predetermined contact state. Thereafter, the substrate 21 was polished with a fine diamond paste having a diameter of 0.5 $\mu$m, thereby completing a magnetic head.

Then, magnetic heads were produced as examples 1 to 5 and comparative examples 1 and 2 in the same manner, except that the composition of the film represented by the formula, Al—$N_{(1-x)}$—$O_x$ (wherein $0.05 \leq x \leq 0.8$) was varied in a range shown in Table 1, and as a comparative example 3 having a conventional alumina layer as an insulating film. The characteristics of the produced magnetic heads were estimated below.

TABLE 1

|  | Ex. 1 | Ex. 2 | Ex. 3 | Ex. 4 | Ex. 5 | Co. Ex. 1 | Co. Ex. 2 | Co. Ex. 3 |
|---|---|---|---|---|---|---|---|---|
| Film composition | X = 0.05 | 0.3 | 0.4 | 0.6 | 0.8 | 0.01 | 0.9 | alumina film |
| Hv | 1380 | 1320 | 1150 | 1120 | 980 | 1450 | 680 | 700 |
| Difference in level (nm) | −5 | 0 | 1.5 | 5 | 10 | −10 | 17 | 15 |
| heat conductivity (W/m · K) | 5.12 | 4.83 | 3.88 | 4.21 | 2.05 | 4.43 | 1.1 | 1.1 |
| withstand voltage (v) | 6 | 10 | 10 | 8 | 8 | 5 | 5 | 5 |
| water resistance | not varied | not varied | not varied | not varied | not varied | X | X | X |

Ex. = Example
Co. Ex. = Comparative Example

The characteristic shown in Table 1 was measured in the following manner.

Film composition: It was measured quantitatively by EPMA (Electron Probe Micro Analyzer).

Vickers hardness Hv: It was measured by Vickers impression made at a load of 100 g.

Difference in level: A difference in level between the substrate and the film was measured by AFM (Atomic Force Microscope) after polishing of a cut face, wherein + indicates that the film protruded from the substrate, and − indicates that the film is recessed from the substrate.

Heat conductivity: The film formed on the thin plate-like substrate having the known thickness value of 50 μm was measured by a thermal efficiency process.

Withstand voltage: A film was formed into a thickness of 100 nm on a conductor substrate and a pattern of 2×4 mm was formed on this film. The voltage was measured until the pattern was fractured.

Water resistance: The magnetic head was immersed in pure water for 24 hours, and a difference in film level between before and after the immersion was measured by AFM.

As apparent from Table 1, it can be seen that when the insulating layer was provided by the film composition represented by the formula, Al—$N_{(1-x)}$—$O_x$ (wherein $0.05 \leq x \leq 0.8$), the heat resistance was excellent; the instability of the characteristic of the magnetic head was not produced due to a temperature rise; a reduction in output due to the polishing at the finishing step was not produced; and moreover, the water resistance was excellent, as compared with the prior art in which the insulating film was formed from alumina.

Particularly, it is apparent that when the film composition represented by the formula, Al—$N_{(1-x)}$—$O_x$ (wherein $0.3 \leq x \leq 0.6$) is used, a smaller difference in film and a higher heat conductivity as well as a higher voltage resistance is reconciled.

In the embodiment, all of the insulating films such as the insulating layer, the gap films and the overcoat were formed by the film having the above-described composition. Alternatively, only the insulating film just on the substrate, or this insulating film and the gap film may be formed for the purpose of escaping the heat of the MR element to the substrate.

The arrangement of the magnetic head is not limited to that in the embodiment, but any other arrangement may be used such as an arrangement in which the positions of the MR element and the writing element are changed with each other.

In addition, the magnetic head including the MR element has been illustrated as an example in the embodiment, but the present invention is applicable to a thin-film magnetic head of a type which includes no MR element and which is capable of reading and writing by the induction-type element. This thin-film magnetic head is effective, because a stability of a soft magnetism can be obtained from the viewpoint of the prevention of the temperature rise.

What is claimed is:

1. A wafer for a magnetic head, comprising a wafer substrate of alumina-titanium carbide, and an insulating layer provided on said wafer substrate and formed of a film composition represented by a formula, Al—$N_{(1-x)}$—$O_x$, wherein $0.05 \leq x \leq 0.8$.

2. A wafer for a magnetic head, comprising a wafer substrate of alumina-titanium carbide, and an insulating layer provided on said wafer substrate and formed of a film composition represented by a formula, Al—$N_{(1-x)}$—$O_x$, wherein $0.3 \leq x \leq 0.6$.

3. A magnetic head, comprising a magnetic head substrate of alumina-titanium carbide, and an insulting layer provided on said magnetic head substrate and formed of a film composition represented by a formula, Al—$N_{(1-x)}$—$O_x$, wherein $0.05 \leq x \leq 0.8$.

4. A magnetic head according to claim 3, further including an MR element, and a gap film provided in the proximity to said MR element and formed of a film composition represented by a formula, Al—$N_{(1-x)}$—$O_x$, wherein $0.05 \leq x \leq 0.8$.

5. A magnetic head according to claim 4, further including an overcoat formed of a film composition represented by a formula, Al—$N_{(1-x)}$—$O_x$, wherein $0.05 \leq x \leq 0.8$.

6. A magnetic head, comprising a magnetic head substrate of alumina-titanium carbide, and an insulating layer provided on said magnetic head substrate and formed of a film composition represented by a formula, Al—$N_{(1-x)}$—$O_x$, wherein $0.3 \leq x \leq 0.6$.

7. A magnetic head according to claim 6, further including an MR element, and a gap film provided in the proximity to said MR element and comprised of a film composition represented by a formula, Al—$N_{(1-x)}$—$O_x$, wherein $0.3 \leq x \leq 0.6$.

8. A magnetic head according to claim 7, further including an overcoat formed of a film composition represented by a formula, Al—$N_{(1-x)}$—$O_x$, wherein $0.3 \leq x \leq 0.6$.

* * * * *